Aug. 18, 1953 W. L. UNGER 2,649,344
PISTON RING
Filed July 24, 1948
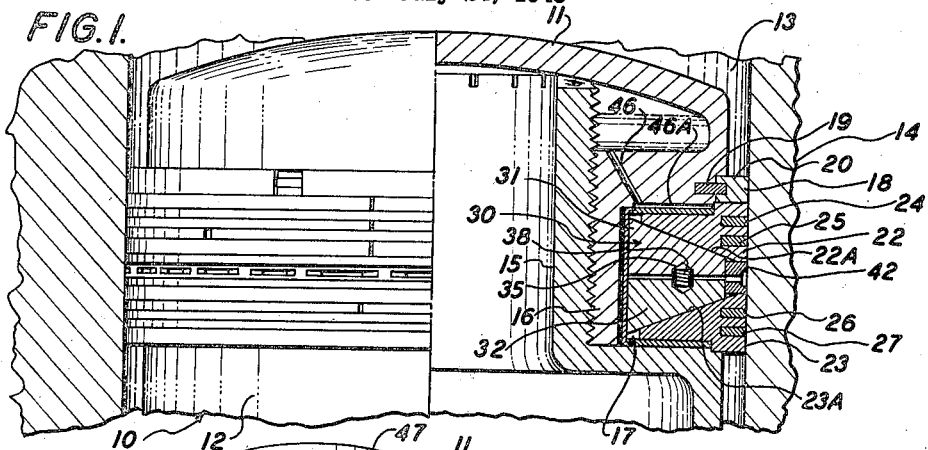
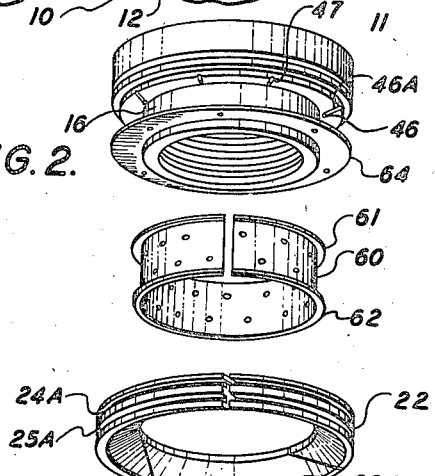
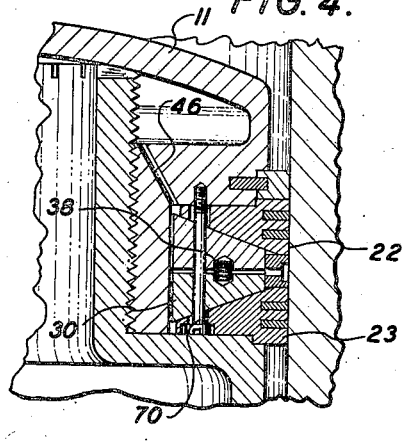
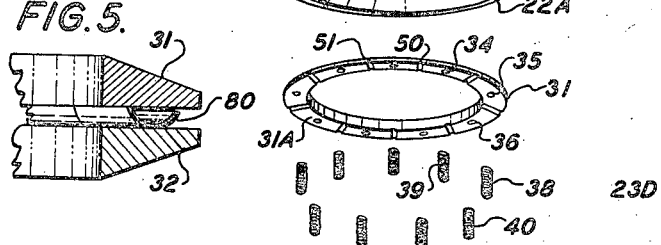
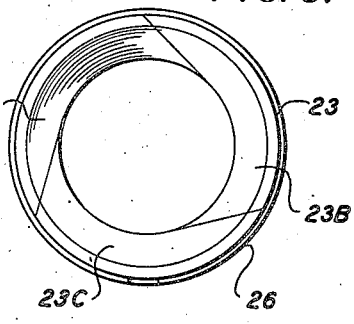
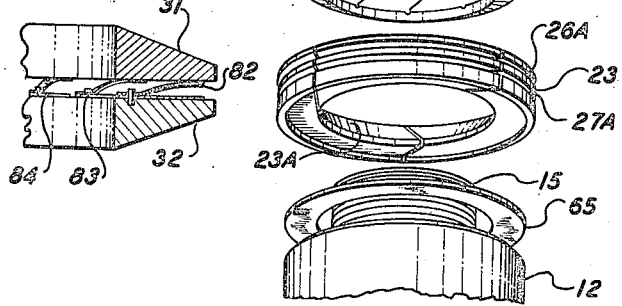
INVENTOR.
WALTER LEE UNGER
BY
James B. Christie
ATTORNEY Patented Aug. 18, 1953

2,649,344

UNITED STATES PATENT OFFICE 2,649,344

PISTON RING

Walter Lee Unger, San Gabriel, Calif.

Application July 24, 1948, Serial No. 40,458

20 Claims. (Cl. 309—27)

This invention relates to pistons and to piston ring structure for pistons. The piston and piston ring structure or assembly of the invention finds use in internal combustion engines, piston pumps, steam engines, cylinder type valves, etc.

Ideally, piston rings should produce certain results and meet specific requirements. Some of these are listed as follows:

1. Keep the cylinder round by producing even wear.
2. Permit or produce proper lubrication of the cylinder wall.
3. Prevent crankcase dilution.
4. Be self-centering so as to insure proper operation.
5. Be easily replaceable—this requirement has nothing to do with the operation of the ring assembly but is desirable from the practical maintenance standpoint.

I have developed a piston ring assembly which satisfies each of the above requirements to a degree heretofore unattainable with conventional ring assemblies. I attain this degree of excellence by provision of an integral self-balancing ring assembly which is self-centering and which develops a balanced pressure against the cylinder walls independent of temperature changes in the engine.

In accordance with the invention I provide a piston ring assembly comprising a first and second annular ring, each having at least one peripheral groove and a split inlay ring in each of the peripheral grooves. The annular rings each have a single bevelled annular face and are sectioned to permit expansion thereof. A spring loaded "balance" ring is disposed between the first and second annular rings and has opposite bevelled annular faces bearing against the bevelled faces of the first and second annular rings.

The force exerted by the split inlay rings against the cylinder walls is a function of the loading of the balance ring. The balance ring conveniently comprises two substantially identical annular rings being frusto-conical in shape with the sloping annular faces thereof facing outwardly. Spring means are disposed between the two frusto-conical rings tending to force them apart. The sloping faces of the balance ring bearing against the sloping face of each of the first and second annular rings produces a force vector in the direction of the cylinder walls the magnitude of which is a function of the spring loading of the balance ring and the angle of the contacting faces of the balance and first and second annular rings. Any change in geometry of the system as a result of temperature changes within the block are compensated for by the spring loaded balance ring and the force exerted by the inlay rings against the cylinder walls is substantially constant regardless of these temperature changes.

It can be seen that this feature of the invention is a big advantage over conventional rings which are usually constructed somewhat smaller, say .002 to .005 inch than the cylinder so as to permit temperature induced expansion of the rings without exerting excessive pressure on the cylinder wall. With conventional rings of this type most efficient operation is obtained only at a single temperature or within a small temperature range at which the expansion of the undersized rings is such as to form a seal against the cylinder walls but is not such as to cause undue wear against the cylinder walls. In the ring assembly of the invention efficient operation is obtained throughout any operating temperature range inasmuch as the spring loaded balancing means not only insures self-centering of the ring structure but also insures substantially uniform pressure against the cylinder walls regardless of changes in dimension thereof or of the rings. Further as the inlay rings wear, the balance ring will compensate therefore; thus increasing the effective life of the rings.

Another feature of the invention is the improved lubrication of the cylinder made possible by the ring structure. In a conventional piston having conventional piston rings the rings are so constructed and so inlayed in the piston as to operate as check valves in feeding oil from the lower portion of the ring assembly up past the several rings. Thus on the downstroke of the piston the rings are displaced upwardly in their grooves receiving a small amount of oil in the groove beneath the ring. On the upstroke of the cylinder the ring is displaced downwardly forcing the oil from the lower part of the groove into the upper part of the groove above the rings. Subsequent downstroke of the piston will force the oil from the upper part of the ring out against the cylinder walls. In this manner oil is carried from the oil sump in the cylinder upwardly past the rings and also past the head into the combustion chamber.

The ring assembly of the invention permits lubrication with a brushing action rather than by splash or vaporization and is thus more positive in its lubrication. In accordance with the invention oil is fed into the area between the first and second annular ring and between the two rings making up the balance ring. The oil flows outwardly therefrom through a so-called "oil ring" which deposits a thin film of oil, with a positive action on the cylinder wall.

These and other features of the invention will be more clearly understood from the following detailed description thereof, taken in relation to the accompanying drawing in which:

Fig. 1 is an elevation view of the upper portion of a piston in accordance with the invention partially in section and including one embodiment of the ring assembly of the invention mounted thereon;

Fig. 2 is an exploded view of the portion of the piston and ring assembly illustrated in Fig. 1;

Fig. 3 is a plan view of one of the annular rings;

Fig. 4 is a partial sectional elevation through the upper portion of a piston showing a modification of the ring structure of the invention;

Fig. 5 is a sectional elevation taken through a balance ring showing alternative spring loading means; and Fig. 6 is a cut away perspective view of a balance ring showing another spring loading means.

Referring to Figs. 1, 2 and 3 there is shown a piston 10 having a dome shaped head 11 and a skirt 12. The piston is shown mounted in a cylinder 13 formed in a block 14. The head and skirt are affixed to each other by threaded posts 15, 16 leaving an enlarged annular channel 17 separating the head and skirt.

A fire ring 18 and a sealer ring 19 are inlaid in a groove 20 in the lower part of the head. The fire ring is a so-called "dead ring" and is grooved around its inner circumference to receive the sealer ring. By this construction the brunt of the flame effect is absorbed by the dead fire ring while the "live" sealer ring is in a protected position. The effective life of the fire ring is materially increased by this expedient.

The "balanced" ring assembly of the invention is held in the annular space 17 between the head and skirt. The ring assembly comprises an upper annular ring 22 and a lower annular ring 23. The annular rings 22 and 23 are each provided with a pair of peripheral grooves. Split inlay rings 24, 25 are mounted in the grooves 24A, 25A in the ring 22 and split inlay rings 26, 27 are mounted in peripheral grooves 26A, 27A of the ring 23. A single groove and inlay ring in each annular ring will suffice but two rings are preferred. The several inlay rings are, like the fire ring, dead rings and as such are less susceptible to fatigue, distortion etc. which contribute to determine the life of conventional live rings. Dead inlay rings may be employed in the invention since the expansion thereof against the cylinder walls is otherwise controlled as explained below.

Each of the rings 22, 23 is provided with a tapered annular face, the tapered face 22A of the upper ring 22 facing downwardly and the tapered face 23A of the lower ring 23 facing upwardly. In the plan view of ring 23 (Fig. 3) it is seen that the ring is formed in three sections 23B, 23C, 23D. The ends of the three sections are formed on a line substantially tangential to the inner periphery of the ring. The sections are preferably formed in this manner rather than radially to produce smooth and uniform expansion and contraction. Thus when the ring 23 expands radially, the several edges of the sections will slide against each other to stabilize the movement. The ring 22 is similarly constructed.

An annular balancing ring 30 of smaller diameter than the rings 22, 23 is disposed between the rings 22, 23 and comprises identical upper and lower annular rings 31, 32. The rings 31, 32 are generally frusto-conical in shape with their bases (flat annular face) facing each other and lying parallel to each other. The rings 31, 32 are provided with a plurality of sockets in adjoining faces as for example sockets 34, 35, 36, etc. in the flat face 31A of the ring 31 (see Fig 2). The plurality of sockets in the upper ring 31 are in vertical alignment with a like number of similar sockets in the lower ring 32 and the two rings are spaced from each other by a plurality of helical springs 38, 39, 40 etc. which seat in the aligned sockets. The several springs are compressed so that the adjoining faces of the rings 31 and 32 touch or almost touch.

The balancing ring may be spring loaded by means other than the several helical springs shown in Figs. 1 and 2. Two such other loading means are illustrated in Figs. 5 and 6. In Fig. 5, an annular split ring 80 is sandwiched between the rings 31, 32. The ring 80 is semi-flexible and curvilinear as viewed in section. The ring 80 acts as a compression spring between the separate rings 31, 32. The three rings may be tied together in any manner which does not interfere with the function thereof. Alternatively they may be left separate and be separately assembled on the piston.

In the embodiment of Fig. 6 a plurality of leaf springs 82, 83, 84, etc. are affixed to one of the rings, say ring 32. The fingers of the springs bearing against the face of the ring 31 perform the same function as the helical springs or spring ring of the foregoing embodiments.

The sloping annular faces of the balancing ring 30 bear against the sloping faces 22A and 23A of the annular rings 22, 23. The spring loading of the balancing ring produces a pressure against the tapered faces 22A, 23A which is translated into an outward thrust against the wall of the cylinder 12. As the geometry of the system changes due to temperature changes in the motor, valve, pump, etc. the springs 38, 39, 40, etc., compensate for such changes by contraction or expansion and compression or extension to produce a substantially even thrust against the tapered faces of the rings 22, 23. This results in a substantially even bearing pressure of the several inlay rings 24, 25, 26, 27 against the cylinder walls. Thus it is not necessary to make the rings initially smaller than the cylinder walls in order to permit temperature expansion since the expansion due to temperature rise will be compensated for by the several springs.

An oil ring 42 is disposed around the balance ring 30 between the annular rings 22, 23. The hollow head 11 of the piston serves as a sump and a plurality of vents 46, 47, etc., open from the sump into the annular space occupied by the ring assembly. Oil flowing through the vents 46, 47, etc. passes between the balance rings 31, 32 and out through ports in the oil ring 42 to lubricate the cylinder walls by positive brushing action. To insure proper oiling even though expansion of the ring assembly is such as to cause the adjoining faces of the rings 31, 32 to touch a plurality of radial grooves 50, 51, etc. are formed in the upper ring 31 and a like number of grooves 52, 53 etc. are formed in the lower ring 32.

To insure adequate lubrication of the fire ring and particularly of the sealer ring, the lower annular face of the piston head is provided with radial grooves 46A, 47A etc. extending from the corresponding oil vents to the outer circumference of the head. By this means the fire and sealer rings are positively lubricated from the inside and do not depend upon accumulating oil from the cylinder wall.

It is convenient for purposes of assembly and replacement to assemble the ring structure of the invention as an easily replaceable unit. This is accomplished in accordance with one embodiment of the invention by the provision of a split tubular sleeve 60 having upper and lower annular lips 61, 62. An annular washer 64 is placed over the upper annular ring 22 and an annular washer 65 is placed beneath the lower annular ring 23. While holding the rings together in assembled position with the washers 64, 65 in place, the split sleeve 60 is compressed and inserted in the position shown in Fig. 1. Upon releasing the sleeve 60 it expands against the inner periphery of the assembled rings with the lips 61, 62 engaging over the ends of the washers 64, 65. In this manner the entire assembly is held together as a unit and may be installed or replaced as such.

The sleeve and two washers are perforated to permit free passage of oil from the several vents into the ring assembly. The inner circumference of the several rings when not employing a sleeve is such as to permit a slip fit over the head post 16. If a sleeve is used the dimensions are such as to permit a slip fit of the assembled unit over the post. The tolerances are such as to allow oil seepage from the several vents around the inside of the ring structure and out through the balance ring and oil ring.

An alternative means of holding the assembly together as a single unit is shown in the partial sectional elevation of Fig. 4. In Fig. 4 the ring assembly is identical with that shown in Fig. 1 including the annular rings 22, 23, and the balance ring 30. In this embodiment the inner portions of the several rings are drilled to receive a plurality of machine screws such as the screw 70 which are threaded into the head 11. The screw holes in the rings 22, 23 are elongated tangentally to the inner circumference of the rings to permit expansion and contraction thereof. The screw holes in the lower ring 23 are countersunk to receive the screw heads. In this manner the ring assembly may be installed with the head as a unit.

It is to be understood, that, although the invention has been described and illustrated in association with the means for unitizing the assembly, it clearly is not a necessary feature of the invention. Thus the locking screws 70, etc., or the split ring 60 may be eliminated entirely and the ring structure may be assembled directly on the piston.

Similarly emphasis has been given to the ring assembly as such. It is also intended to point out the advantages of the piston construction.

A piston in accordance with the invention has a head and a reduced diameter section directly beneath the head to receive one or more ring assemblies in accordance with the invention. In the embodiment shown the piston has a skirt separated from the head by the annular channel 17; the skirt and head being fastened together in spaced relationship by the threaded posts 15, 16. The spacing between the two is determined by the length of these posts; the post 15 abutting against the inside face of the piston head and the post 16 abutting against the upper annular face of the skirt. As the rings wear thin, the posts can be reduced in length so as to continue to hold the rings snugly against each other. By this simple expedient "slap" and oil seepage caused by worn rings can be eliminated.

In addition to being so constructed to permit use of the ring assembly of the invention the piston has the further advantageous feature of permitting the removal of the head and rings regardless of the type of rings employed without removing the piston itself from the block. To anyone familiar with replacing piston rings this feature of the invention will be outstanding. Thus by screwing the head 11 onto the skirt 12 so as to leave an annular enlarged groove between the head and the body I am enabled to employ the improved ring assembly of the invention and at the same time replace or repair rings without removing the pistons or connecting rods from their position in the engine block.

I claim:

1. A ring assembly for pistons comprising a first and second annular ring disposed around the piston and each having at least one groove in the periphery thereof, a split inlay ring in each of the peripheral grooves, the annular rings each having a bevelled face and being sectioned for expansion thereof, and a spring loaded balance ring disposed between the first and second annular rings and having opposite bevelled faces bearing against the bevelled faces of the first and second annular rings.

2. A ring assembly for a piston having a body, a head, and an annular space between the body and the head, comprising a first and second annular ring disposed in the annular space and each having at least one groove in the periphery thereof, a split inlay ring in each of the peripheral grooves, the annular rings each having a bevelled face and being sectioned for expansion thereof, and a spring loaded balance ring disposed between the first and second annular rings and having opposite bevelled faces bearing against the bevelled faces of the first and second annular rings.

3. Apparatus according to claim 2 wherein each of the annular rings is formed in 3 sections the end edges of which are substantially tangental to the inner circumference of the ring.

4. Apparatus according to claim 2 wherein each of the inlay rings is a "dead" ring, expansion thereof being determined by the loading of the balance ring and by the slope of the adjoining faces of the annular rings and balance ring.

5. A ring assembly for a piston having a body, a head threadable onto the body forming an annular space between the body and the head, comprising a first and second annular ring disposed in the annular space and each having at least one groove in the periphery thereof, a split inlay ring in each of the peripheral grooves, the annular rings each having a single bevelled face and being sectioned for expansion thereof, and a spring loaded balance ring disposed between the first and second annular rings and having opposite bevelled faces bearing against the bevelled faces of the first and second annular rings.

6. Apparatus according to claim 5 wherein the spring loaded balance ring comprises a first and second ring, each being frusto-conical in shape and disposed with their bases facing each other, and spring means disposed between the first and second ring urging them apart.

7. Apparatus according to claim 6 wherein the spring means comprises a plurality of helical springs vertically disposed between the two rings and seating at opposite ends in the bases of the two rings.

8. Apparatus according to claim 6 wherein the spring means comprises a plurality of leaf springs affixed around the base of one of said rings and having extending fingers bearing against the base of the other of the two rings.

9. Apparatus according to claim 6 wherein the spring means comprises an annular split ring disposed between the first and second rings, the annular split ring having an arcuate cross section so as to urge the first and second rings apart.

10. Apparatus according to claim 6 wherein the base of each of the first and second rings is provided with a plurality of radial grooves for passage of oil when the rings are forced together.

11. A ring assembly for a piston of the type including a body, a head threadable onto the body forming an annular space between the body and the head, a passageway between the body and head for flow of oil from the body into the head, and a plurality of ports opening through the under face of the head into the annular space, the ring assembly comprising a first and second sectioned ring disposed in the annular space and each having at least one groove in the periphery thereof, a split inlay ring in each of the peripheral grooves, the sectioned rings each having a bevelled face and being disposed in the annular space with the bevelled faces facing each other, and a spring loaded balance ring disposed between the first and second annular rings and having upper and lower bevelled faces bearing against the bevelled faces of the first and second annular rings.

12. A ring assembly for pistons comprising first and second sectioned annular rings each having at least one groove in the periphery thereof, a split inlay ring in each of the peripheral grooves, the sectioned rings each having a sloping face and being disposed with the sloping faces facing each other, a balance ring disposed between the annular rings, the balance ring comprising first and second frusto-conical rings disposed with their sloping faces outwardly and bearing against the sloping faces of the annular rings and spring means disposed between the first and second rings for urging them against the annular rings, and means for holding the annular rings and balance ring together as a unit.

13. Apparatus according to claim 12 wherein the means for holding the rings together comprises a first and second washer disposed against the outer faces of the first and second annular rings, and a split sleeve having outwardly protruding end lips and disposed around the inner circumference of said rings with the lips extending over the inner edge of the first and second washer.

14. Apparatus according to claim 12 wherein the means for holding the rings together comprises a plurality of screws passing through holes formed around the inner edges of the several rings and threaded into the head of the piston, the holes in the bottom annular ring being countersunk to receive the screw heads.

15. A ring assembly for a piston of the type including a head member, and a skirt of substantially the same diameter as the head member joined to the head member so as to form an annular channel between the skirt and head, comprising first and second annular rings disposed around the piston in said annular channel, each ring having a beveled face and being sectioned for expansion thereof, and means disposed between the adjoining beveled faces of the split rings for exerting a thrust thereon perpendicular to the radius of the rings.

16. A ring assembly for a piston of the type including a head member, a skirt of substantially the same diameter as the head member, the skirt and head member being separated by a reduced diameter section forming an annular channel around the piston, the ring assembly comprising first and second annular rings disposed around the piston in said annular channel, the annular rings each having a beveled face and being sectioned for expansion thereof, and means disposed between adjoining beveled faces of the annular rings to exert a thrust therebetween perpendicular to the radius of the piston.

17. A ring assembly for a piston comprising a first and second annular ring disposed around the piston and each having at least one groove in the periphery thereof, a split ring in each of the peripheral grooves, the annular rings each having a beveled face and being sectioned for expansion thereof, and a resiliently loaded balance ring disposed between the first and second annular rings and having opposite beveled faces bearing against the beveled faces of the first and second annular rings.

18. A ring assembly for a piston having a body, a head, and an annular space between the body and head comprising a first and second annular ring disposed in the annular space and each having at least one groove in the periphery thereof, a split ring in each of the peripheral grooves, the annular rings each having a beveled face and being sectioned for expansion thereof, and a resiliently loaded balance ring disposed between the first and second annular rings and having opposite beveled faces bearing against the beveled faces of the first and second annular rings.

19. Apparatus according to claim 18 wherein the resiliently loaded balance ring comprises a first and second ring each being frusto-conical in shape and oriented with their bases facing each other.

20. A ring assembly for pistons comprising first and second sectioned annular rings each having at least one groove in the periphery thereof, a split retaining ring in each of the peripheral grooves, the sectioned annular rings each having a sloping face and being disposed with the sloping faces facing each other, a balance ring disposed between the annular rings, the balance ring comprising first and second frusto-conical rings disposed with their sloping faces outwardly and bearing against the sloping faces of the annular rings, and resilient means disposed between the first and second frusto-conical rings for urging them against the annular rings, and means for holding the annular ring and balance ring together as a unit.

21. Apparatus according to claim 20 wherein the means for holding the rings together comprises a first and second plate disposed against the opposite outer faces of the first and second annular rings and a split sleeve having outwardly protruding edge lips and disposed around the inner circumference of said rings with the lips engaging and holding the first and second plates.

WALTER LEE UNGER.

References Cited in the file of this patent

UNITED STATES PATENTS

| Number | Name | Date |
|---|---|---|
| 687,276 | Smyser | Nov. 26, 1901 |
| 787,775 | Lewis | Apr. 18, 1905 |
| 1,394,898 | Harriman | Oct. 25, 1921 |
| 1,530,383 | Livingood | Mar. 17, 1925 |
| 1,546,622 | Cook | July 21, 1925 |
| 1,553,893 | Courtot | Sept. 15, 1925 |
| 1,605,810 | Cormier | Nov. 2, 1926 |
| 1,627,400 | Meyer | May 3, 1927 |
| 1,636,542 | Willis | July 19, 1927 |